United States Patent Office 3,463,720
Patented Aug. 26, 1969

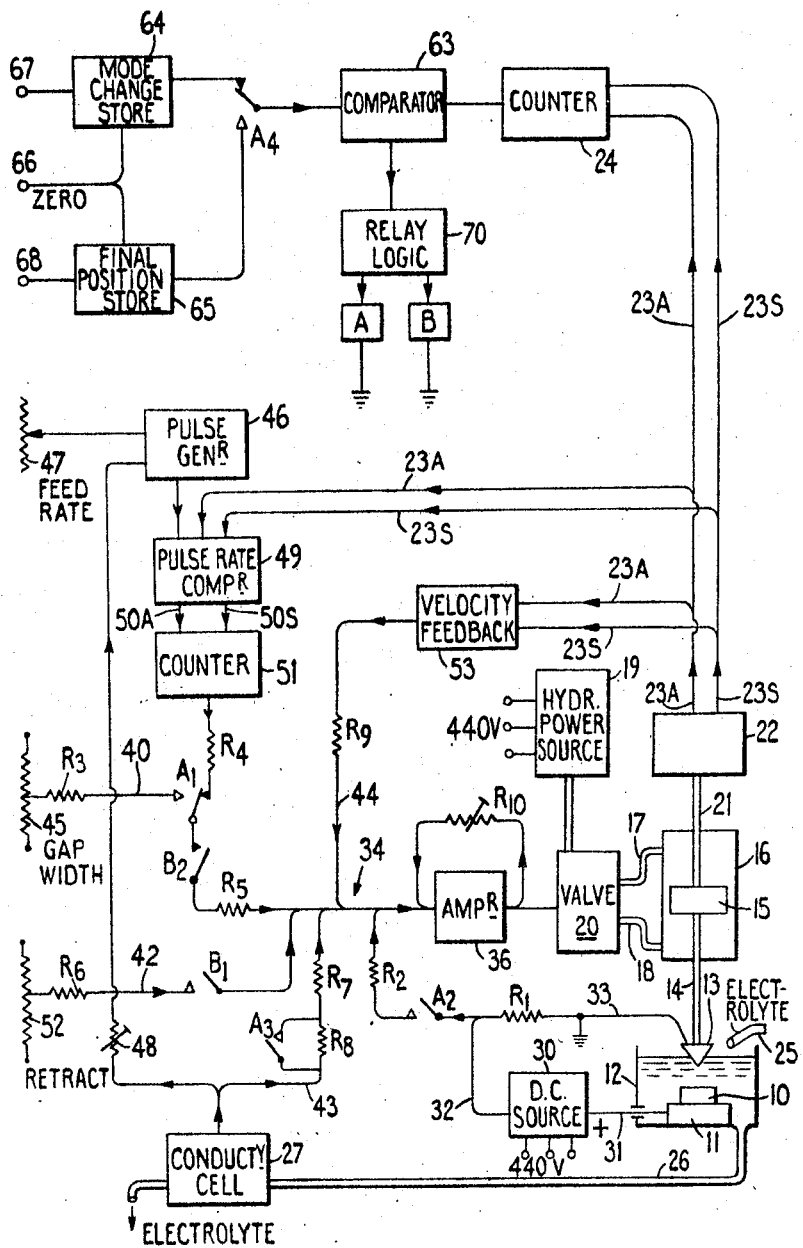

3,463,720
ELECTRO-CHEMICAL MACHINING
CONTROL SYSTEM
Bernard H. Wilkinson, Glasgow, and Harry Ogden, Edinburgh, Scotland, assignors to Rolls-Royce Limited and Ferranti Limited, Derby, England, and Hollinwood, England
Filed Oct. 11, 1965, Ser. No. 494,829
Claims priority, application Great Britain, Oct. 16, 1964, 42,440
Int. Cl. B23p 1/14
U.S. Cl. 204—224                    11 Claims

ABSTRACT OF THE DISCLOSURE

A control system for an electro-chemical machining apparatus in which the actuator of tool movement is controlled by a closed digital servo loop mode for initial approach and rough machining, and by a closed analog servo loop mode for approach to a finished workpiece size, there being a store for presetting the condition for a changeover between the two modes according to the distance of the tool from the workpiece, and a relay for automatically effecting the changeover when this distance has reached the preset value.

---

This invention concerns a control system for a machine tool. The invention is particularly, but not exclusively, applicable to the control of electro-chemical machining apparatus.

According to the present invention, a control system for an electro-chemical machining apparatus including an actuator for causing relative movement of a machining tool and a workpiece, means for presetting at least two modes of such movement, means for providing electrical pulses representing actual incremental relative movements between the tool and the workpiece to effect initial machining of said workpiece, a closed digital servo loop for controlling the actuator in one of said modes in dependence on said pulses, a closed analog servo loop for controlling the actuator in another said mode in which approach to a finished workpiece size is made, means for presetting the condition for a change from one said mode to the other said mode in dependence on a distance of the machine tool from said workpiece, and means for automatically effecting said change when said distance has the preset value.

The electrical pulses representing actual incremental relative movements between the tool and the workpiece may be derived from the movement of a moiré fringe pattern formed by the relative movement of two optical gratings fixed respectively relative to the tool and the workpiece.

Means may additionally be provided for presetting a second value of said distance representing the condition for the cessation of machining by said tool, and means for halting the said relative movement of the tool and the workpiece when said distance has said second preset value.

The present invention also includes apparatus for electro-chemically machining a workpiece, said apparatus including means for directing a flow of electrolyte between the tool and the workpiece, and an electrical power source for establishing a potential difference between the tool and the workpiece, said apparatus being operated in the closed digital servo loop in a first mode of operation in which the tool is advanced at a predetermined rate towards the workpiece to effect initial machining thereof and in the closed analog servo loop in a second mode of operation in which approach to a finished workpiece is made.

In a preferred embodiment the actuator of the control system is additionally controlled in at least one of said modes by a signal proportional to the conductivity of the electrolyte.

There are preferably two modes of relative movement of the tool and the workpiece, in the first of which the rate of said relative movement is maintained substantially constant, and in the second of which the gap between the tool and the workpiece is maintained substantially constant.

Means may be provided for determining the working current across said gap and for feeding to said servo loop in said second mode of operation a signal proportional to said working current, the control system being operative to modify the gap to maintain the current and, therefore, the gap, constant. In addition, means may be provided for automatically operating the actuator to cause retraction of the tool relative to the workpiece when said parameter has said second preset value.

The invention is illustrated, merely by way of example, in the accompanying drawing which is a schematic diagram of a control system in accordance with one embodiment of the present invention.

The drawing shows a control system for an electro-chemical machining apparatus. A workpiece 10 is mounted on a worktable 11 in a tank 12 of electrolyte. A tool 13 is mounted above workpiece 10 for vertical movements relative thereto. The tool 13 is fixed to the end of a rod 14 which is carried by a hydraulic actuator piston 15 mounted within a cylinder 16. Two inlet-outlet ports 17, 18 communicating with opposite sides of the piston 15 communicate with a source 19 of hydraulic power via an electrically operated two-way valve 20. The actuator piston 15 is adapted to control the movement of the tool 13 towards and away from the workpiece 10; a movement of tool 13 towards the workpiece 10 will for convenience be referred to as a forward movement and a movement of tool 13 away from workpiece 10 will be referred to as a rearward movement.

A further rod 21 is fixed to the piston 15 on the side opposite to that to which rod 14 is fixed. The rod 21 is coupled to a device 22 which is adapted to provide electrical pulses representative of incremental movements of the piston 15 and thus of the tool 13. The said pulses may be derived from the response of photocells (not shown) to the movement of a moiré fringe pattern formed by two optical gratings (not shown). Thus one said grating may be moved with the tool 13 so that the resulting pattern also moves with the tool 13. In this arrangement the pulses after amplification are delivered to an Add channel 23A or a Subtract channel 23S in dependence on the direction of tool movement; it will be assumed that a forward movement delivers the pulses to the Add channel 23A while rearward movement delivers the pulses to the Subtract channel 23S. The device 22 may include a circuit for increasing the resolution of the incremental measurement. The circuits may increase the basic resolution of the measurement system by a factor 2, 4, 10, 20 or 50. Channels 23 are connected to a bi-directional counter 24 for the pulses in the respective channels 23A, 23S to be counted algebraically. These pulses are also used as servo feedback signals in the control system now to be described.

A feed pipe 25 for electrolyte leads a steady flow of electrolyte to the gap between tool 13 and workpiece 10, a compensating drainage being provided by an outlet pipe 26 in the bottom of the tank 12. The outlet pipe 26 leads it to a reservoir (not shown) via a conductivity cell 27 which determines the conductivity of the electrolyte and provides a signal which varies with changes in said conductivity.

The positive terminal of a D.C. power source 30 is connected to the worktable 11 through a line 31 and the negative terminal is connected to the tool 13 through a line 32, a resistor $R_1$ and a line 33, the tool 13 being earthed. Line 32 is connected via contacts $A_2$ of a relay A and a resistor $R_2$ to a terminal point 34 in a control line 35. Line 35 carries control signals to the two-way valve 21 and thus controls movement of tool 13 in the manner to be described.

Also connected to terminal point 34 are lines 40, 43, 44. Line 40 carries signals from a gap width control potentiometer 45 (with preset adjustment) through a resistor $R_3$ to the normally open side of a set of relay changeover contacts $A_1$ of relay A.

A pulse generator 46 provides pulses which represent required forward movements of the tool 13 at a pulse rate or repetition frequency which is controllable by a feed-rate control potentiometer 47, and which receives supplementary control signals from the conductivity cell 27 through a variable resistor 48. The pulses thus generated are applied as one of the inputs to a pulse-rate comparator stage 49; to the other input of this stage are applied the pulses received from device 22 over channels 23. Stage 49 subtracts from the pulses received from generator 46 the pulses received over channel 23A, supplying the difference pulses over an output channel 50A or 50S according to whether the pulse rate from the generator 46 is greater or less than the pulse rate from the device 22. Where the pulses are received from the device 22 over channel 23S, they are added to those from the generator 46 and delivered over channel 50A. The comparator stage 49 thus acts as a comparator of the pulse rates from the generator and from device 22. To allow stage 49 to act as a comparator when fed with random Add and Subtract pulses which may occur at the same instant of time, an input sorting circuit may be included in this stage.

Channels 50 are connected to a counter 51, in which the pulses received from stage 49 are converted into a signal in the form of a direct-current voltage of a sense dependent on which of the channels 50A, 50S has supplied them. It will be assumed that this D.C. voltage is positive when the pulses arrive over channel 50A, representing a required forward movement of the tool 13, and is negative when the pulses arrive over channel 50S and a rearward movement is necessary.

This output from the counter 51 is applied by way of a resistor $R_4$, the normally closed side of contacts $A_1$, a pair of normally closed relay contacts $B_2$ and a resistor $R_5$ to the terminal point 34.

Line 42 is connected to a retract potentiometer 52 and includes a resistor $R_6$ and normally open relay contacts $B_1$ of a relay B. Line 43 connects cell 27 to terminal point 34 via two resistors $R_7$, $R_8$, tthe second of which may be short-circuited by a pair of relay contacts $A_3$ (normally open) of relay A. Line 44 carries velocity feedback signals to the terminal point 34 via a resistor $R_9$ from a velocity-feedback stage 53 which derives a D.C. signal proportional to the velocity of the tool 13 from the pulse rate of the pulses in channels 23. This signal may alternatively be derived from an electrical tachometer driven by means of gearing or direct from the rod 14 or extension 21.

The control line 35 is connected to the terminal point 34 through a D.C. amplifier 36 to the electrical control input of the two-way valve 20. Amplifier 36 includes a negative-feedback circuit by way of a variable resistor $R_{10}$.

There are two modes of operation of the control system: mode I, in which the tool 13 is caused to approach the workpiece 10 at a steady rate; and mode II, in which the tool 13 is maintained at a fixed distance (subject to slight modifications in dependence on certain parameters of the machining operation) from the surface of the workpiece 10, with the result that the tool 13 is moved steadily towards the workpiece 10 as that surface is electrolytically eroded away. The parameter in dependence on which the condition of the mode change is to be preset is the position of the tool 13 with respect to the workpiece 10.

The counter 24 provides an indication of the position of tool 13 and signals proportional to its reading are directed via a line 62 to a numerical comparator 63. The control of relays A and B is effected in dependence on a comparison of the number held in the counter 24 with numbers preset in two stores 64 and 65 to define respectively the instants of changeover from mode I to mode II and of finishing the machining process, the zero position of the tool being fed into each store from an input point 66. In each case, each digit of the number represents the same extent of movement as is represented by one of the pulses in channels 23. The output from store 64 is connected to the normally closed side of a set of single-pole changeover contacts $A_4$ of relay A, the normally open side of which is connected to the output from store 65. The common (movable) contact of the set of contacts $A_4$ is connected as one of the two inputs to the numerical comparator 53, the other input of which is the signal representing the total held in couner 24 on line 62. The output from the comparator 63 is applied by way of a relay logic stage 70 to control the relays A and B.

In operation, the various pre-settable controls are set in accordance with the machining process to be performed: the gap width required between tool 13 and workpiece 10 (e.g. 0.03″) is pre-set on the gap width control potentiometer 45; the feed rate of the tool (e.g. 0.001″–0.5″ per minute) is pre-set on the feed rate control potentiometer 47; the extent of the retracting movement of the tool 13 is pre-set on the retraction potentiometer 52; the zero position of the tool 13 is set into the stores 64, 65 from the input point 66; the position of the tool at which the mode of operation is to change over is pre-set into the store 65 from a pulsed input 67 and the final position of the tool at which machining is to finish is pre-set into the store 65 from a pulsed input 68.

With the tool 13 in its zero position, the contents of counter 24 are cleared. Under these conditions relays A and B are inoperative, with their respective contacts in the positions depicted in the drawing. Store 64 is thus connected by contacts $A_4$ to comparator 63. As the two inputs to the comparator are unequal—zero from counter 24 and the pre-set mode-change number from stores 64— the comparator 63 at this stage has no effective output signal.

With relay contacts $A_1$ in the positions shown, the mode I operation is initiated. During this mode, the control of the actuator piston 15 and hence of the tool 13 is exercised by the closed digital servo loop in which an error signal is derived in the counter 51 from the comparison of the command pulses from pulse generator 46 with the pulses representing actual tool movements from the device 22. This error signal, which is in the form of a direct voltage of a polarity representing the required direction of tool movement, is applied by way of contacts $A_1$ and $B_2$, resistor $R_5$, and amplifier 36 to the control line 35 and thence to the valve 20. Normally the actuator piston 15 will lag slightly behind the command signal from pulse generator 46, so that the Add pulses in channel 23A from device 22 are subtracted in the pulse rate comparator stage 49 from the generator pulses to provide an output over channel 50A from which the counter 51 derives an error signal of positive sense to require a forward movement of the tool 13. Should there be an overshoot of the tool 13, the Add pulses from stage 22 would become the more numerous, thereby providing the output from the comparator stage 49 in channel 50S, reversing the sense of the error signal, and thereby sufficiently retracting the tool 13. Any backward movement of the tool 13 would cause the pulses from the device 22 to be in channel 23S, with the result that the generator pulses are added to the pulses representing tool movement from the device 22 and a strong positive error signal developed to correct the movement. A signal proportional to the tool velocity is applied by way of the velocity feedback stage 53 to prevent any tendency of the tool 13 to hunt.

As contacts $A_2$ are open, the control in dependence on the current across the gap is not as yet exercised. Variations in the conductivity of the electrolyte result in the signal applied from the conductivity cell 27 to the pulse generator 46 modifying the pulse rate to compensate for the conductivity change. With contacts $A_3$ open, resistors $R_7$ and $R_8$ together attenuate the direct application to valve 20 of this supplementary control signal. Thus the tool 13 is moved steadily forward and for each incremental movement of it a pulse is fed by the device 22 into the counter 24. The position error of the tool 13 can be less than 0.002″ by this arrangement.

The operation continues in this manner in mode I until a pulse in channel 23A brings the total in counter 24 up to the number preset in the store 64 to represent the condition for changing to mode II. The respective inputs to the comparator 63 will now be equal and the output signal of the comparator 63 is interpreted by the relay logic stage 70 as an instruction to operate relay A causing changeover of the associated contacts $A_1$–$A_4$.

The changeover of contacts $A_1$ causes the control of the tool 13 to be transferred from pulse generator 46 to the gap width control potentiometer 45, which now supplies a command signal to amplifier 36 by way of resistor $R_3$, contacts $A_1$, contacts $B_2$, and resistor $R_5$. With the isolation of the pulse generator 46, the pulses from the device 22 are no longer effective for the positional feedback measurement. Instead, this function is taken over by the signal proportional to the current across the gap between the tool 13 and the workpiece 10. The closing of contacts $A_2$ applies this signal, via line 33, in a sense opposite to that of the command signal, to the input to amplifier 36, whence a resultant error signal is developed on the control line 35 for the control of valve 20. The pulses from the device 22, however, are still used for the derivation in the velocity feedback stage 53 of a velocity feedback signal. The controlling servo loop is thus now of an analogue character.

The closing of contacts $A_3$ to short-circuit resistor $R_8$ causes the signal from the conductivity cell 27, dependent on the conductivity of the electrolyte, to be applied with less attenuation to the amplifier 36 to compensate for changes in the value of the electrolyte conductivity.

In this mode II of operation, the tool 13 is maintained at that constant distance from the surface of the workpiece 10 which is determined by the setting of the gap width control potentiometer 45. The erosion of this surface tends to increase the gap between tool 13 and workpiece 10; this reduces the feedback through contacts $A_2$ which is proportional to the current across the gap, and the consequent increase in the resultant error signal on the control line 35 causes the tool 13 to be moved forward to restore the gap to the desired width. In practice, this takes place continuously, a small error signal being continuously developed and the tool 13 being moved steadily forward to maintain the gap width constant as the workpiece surface is eroded away. Variations in the gap current which are due to changes in the electrolyte rather than to changes of the gap width are compensated for by the feedback from the conductivity cell 27.

For each incremental forward movement of the tool 13, a pulse is fed into counter 24 as before. Owing to the operation of relay A and consequent changeover of contacts $A_4$, however, the comparison by comparator stage 63 is now with the number preset in the store 65. When the counter 24 reaches that number, therefore, relay A is restored to its inoperative condition and relay B is operated. The opening of the associated contacts $B_2$ and closing of contacts $B_1$ transfers the control to the retract potentiometer 52, whilst the opening of contacts $A_2$ renders the positional feedback ineffective. As the signal from potentiometer 52 is negative, the tool is retracted, at a speed controlled by the velocity feedback from the stage 53. At the same time, electrolyte flow through feed pipe 25 is stopped and the power source 30 is switched off, so that no further machining takes place as the tool 13 is retracted.

The relays A and B are then reset in their inoperative conditions as shown in the drawing and the apparatus is ready for another machining operation.

It will be appreciated that, although the tool 13 is mover relative to the workpiece 10, the workpiece 10 could be the mobile member. Also, any suitable means other than hydraulic power may be used to effect the relative movement between tool 13 and workpiece 10.

Although not illustrated, a device for stabilising the control "loop" is provided. The load mass (i.e. of the tool 13 and its supporting equipment) is inertial with little or no viscous damping, except for the non-linear damping produced by the increase in static thrust as the gap is narrowed, and thus the control "loop" will be underdamped at the resonant frequency of the combination comprising this load mass and the hydraulic actuator. This will lead to the usual problem in hydraulic control systems: the impractibility, without auxiliary feedback, of obtaining sufficient loop gain to reduce the position error and at the same time preventing loop oscillation at the resonant frequency.

To stabilise the control loop several alternative arrangements may be used, for example:

(a) the provision of a bleed orifice across piston 15;
(b) providing acceleration feedback (either from dynamic pressure feedback valves or from pressure transducers);
(c) providing acceleration feedback from an accelerometer mounted on actuator piston 15.

The use of a bleed orifice (a) is impractical where a large static thrust (for example 20–60 tons) is required, as it would lead to excessive power dissipation in the bleed orifice, resulting probably in overheating of the hydraulic fluid.

The use of either a dynamic pressure feedback valve or pressure transducers (b) would also be made difficult by the presence of the large static thrust; a signal proportional to the pressure difference across the actuator piston due to the acceleration would have to be fed back and this signal would not be resolved by a pressure transducer capable of withstanding the high static pressure.

Therefore, an accelerometer (c) is preferably used to stabilise the control loop.

The invention is, it will be appreciated, also applicable to the control of, for example, a grinding process in which in a first mode of operation rough cuts are to be made at a predetermined feed rate until a predetermined depth of cut is made in a workpiece and, thereafter, in a second mode, finer cuts are made at a predetermined grinding wheel contact pressure. Here the parameter that decides the mode changeover may be some quantity dependent on the load on the grinding wheel—such for example as the current taken by its driving motor, or the output from a strain gauge in the mounting of the wheel.

Resistance welding is among other fields of possible application of the invention.

We claim:

1. A control system for an electro-chemical machining apparatus including an actuator for causing relative movement of a machining tool and a workpiece, means for presetting at least two modes of such movement, means for providing electrical pulses representing actual incremental relative movements between the tool and the workpiece to effect initial machining of said workpiece, a closed digital servo loop for controlling the actuator in one of said modes in dependence on said pulses, a closed analog servo loop for controlling the actuator in another said mode in which approach to a finished workpiece size is made, means for presetting the condition for a change from one said mode to the other mode in dependence on the distance of the machine tool from said workpiece, and means for automatically effecting said change when said distance has the preset value.

2. A control system as claimed in claim 1 wherein the means for providing said electrical pulses comprises a device having two optical gratings fixed respectively relative to the tool and the workpiece and means for deriving said pulses from the movement of a moiré fringe pattern formed by the relative movement of said gratings.

3. A control system as claimed in claim 1 wherein the actuator is hydraulically operated and is controlled by an electrically operated hydraulic valve which is connected in said servo loop.

4. A control system as claimed in claim 1 comprising additionally means for presetting a second value of said distance representing the condition for the cessation of machining by said tool, and means for halting the said relative movement of the tool and the workpiece when said distance has said second preset value.

5. A control system as claimed in claim 2 further including counter means for deriving the pulses representative of the movement of said fringe pattern in the form of a train of add pulses when the direction of fringe movement is in a first direction and in the form of a train of subtract pulses when the direction of fringe movement is in a second direction.

6. A control system as claimed in claim 5 wherein the digital servo loop includes means for supplying a command train of pulses at a controllable repetition frequency, a pulse rate comparator arranged to compare the command train of pulses with the pulses representative of fringe pattern movement so as to modify the command train in dependence upon the relative magnitudes of the repetition frequency of the command train and fringe pattern pulse train, two output channels and a converter stage, said comparator delivering the modified command train over one of two of said output channels to said converter stage for converting each modified train into a direct current signal, the sense of which is dependent on the route of said train.

7. An apparatus for electro-chemically machining a workpiece, said apparatus including a control system for controlling the relative position of the machining tool and workpiece according to claim 1 and said apparatus including means for directing a flow of electrolyte between the tool and the workpiece, and an electrical power source for establishing a potential difference between the tool and the workpiece, said apparatus being operated in the closed digital servo loop in a first mode of operation in which the tool is advanced at a predetermined rate towards the workpiece to effect initial machining thereof, and in the closed analog servo loop in a second mode of operation in which approach to a finished workpiece size is made.

8. Apparatus as claimed in claim 7 wherein the actuator of the control system is additionally controlled in at least one of said modes by a signal proportional to the conductivity of the electrolyte.

9. Apparatus as claimed in claim 7 wherein there are two modes of relative movement of the tool and the workpiece, in the first of which the rate of said relative movement is maintained substantially constant, and in the second of which the gap between the tool and the workpiece is maintained substantially constant.

10. Apparatus as claimed in claim 9 comprising means for determining the working current across said gap and for feeding to said servo loop in said second mode of operation a signal proportional to said working current, the control system being operative to modify the gap to maintain the current, and therefore the gap, constant.

11. Apparatus as claimed in claim 7 and including a control system wherein means are provided for automatically operating the actuator to cause retraction of the tool relative to the workpiece when said parameter has said second preset value.

References Cited

UNITED STATES PATENTS

| | | | |
|---|---|---|---|
| 2,785,353 | 3/1957 | Fenemore | 318—20.260 |
| 2,907,937 | 10/1959 | Apgar et al. | 318—20.260 |
| 2,927,191 | 3/1960 | Matulaitus | 204—225 XR |
| 3,175,093 | 3/1965 | De Lang | 250—237 |
| 3,219,830 | 11/1965 | Sharman et al. | 250—237 |
| 3,275,538 | 9/1966 | Haupt et al. | 204—224 XR |
| 3,288,693 | 11/1966 | Livshits | 204—224 XR |
| 3,323,030 | 5/1967 | Inaba et al. | 318—20.605 XR |
| 3,365,381 | 1/1968 | Fromson | 204—143 |

JOHN H. MACK, Primary Examiner

D. R. VALENTINE, Assistant Examiner

U.S. Cl. X.R.

204—143, 225; 318—20.260